United States Patent
Mori

(10) Patent No.: US 9,628,649 B2
(45) Date of Patent: Apr. 18, 2017

(54) SCANNING APPARATUS AND COMPUTER-READABLE MEDIUM STORING PROGRAM THEREFOR

(71) Applicant: BROTHER KOGYO KABUSHIKI KAISHA, Nagoya-shi, Aichi-ken (JP)

(72) Inventor: Hiroko Mori, Handa (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/813,594

(22) Filed: Jul. 30, 2015

(65) Prior Publication Data
US 2016/0037008 A1    Feb. 4, 2016

(30) Foreign Application Priority Data

Aug. 1, 2014   (JP) .................................. 2014-157540

(51) Int. Cl.
| | |
|---|---|
| *G06F 15/00* | (2006.01) |
| *H04N 1/00* | (2006.01) |
| *H04N 1/387* | (2006.01) |

(52) U.S. Cl.
CPC ..... *H04N 1/00718* (2013.01); *H04N 1/00748* (2013.01); *H04N 1/00774* (2013.01); *H04N 1/3878* (2013.01)

(58) Field of Classification Search
CPC ........... H04N 1/00718; H04N 1/00748; H04N 1/00774; H04N 1/3878
USPC ....................................................... 358/518
See application file for complete search history.

(56) References Cited

U.S. PATENT DOCUMENTS

| | | | | |
|---|---|---|---|---|
| 7,477,869 | B2* | 1/2009 | Kawaai | G03G 15/6564 271/226 |
| 2007/0081212 | A1* | 4/2007 | Tonami | H04N 1/0035 359/197.1 |
| 2007/0285690 | A1* | 12/2007 | Matsuda | H04N 1/401 358/1.9 |
| 2011/0085186 | A1* | 4/2011 | Yi | H04N 1/00005 358/1.9 |
| 2012/0061909 | A1 | 3/2012 | Shikama et al. | |
| 2013/0182002 | A1* | 7/2013 | Macciola | H04N 1/387 345/589 |

FOREIGN PATENT DOCUMENTS

| | | |
|---|---|---|
| JP | 2008-167093 A | 7/2008 |
| JP | 2009-171217 A | 7/2009 |
| JP | 2012-63523 A | 3/2012 |

* cited by examiner

*Primary Examiner* — Mark Milia
(74) *Attorney, Agent, or Firm* — Merchant & Gould P.C.

(57) ABSTRACT

A scanning apparatus is controlled to extract edges of an original document from an image scanned by a scanning device, execute an end obtaining process which causes the scanning apparatus to obtain a leading end of the original document and a trailing end of the original document based on the edges extracted in the extraction process, an inclination obtaining process to obtain a first inclination of the leading end and a second inclination of the trailing end, and a determination process to determine that a rotational skew has occurred when a difference between the first inclination and the second inclination is greater than a rotational skew threshold, the rotational skew being a change of inclination of the original document during conveyance of the original document.

17 Claims, 11 Drawing Sheets

SCANNING APPARATUS AND COMPUTER-READABLE MEDIUM STORING PROGRAM THEREFOR

CROSS-REFERENCE TO RELATED APPLICATION

This application claims priority under 35 U.S.C. §119 from Japanese Patent Application No. 2014-157540 filed on Aug. 1, 2014. The entire subject matter of the application is incorporated herein by reference.

BACKGROUND

Technical Field

The present disclosures relate to a scanning apparatus, a non-transitory computer-readable medium storing a program and a method for such a scanning apparatus. More particularly, the present disclosures relate to a technique of determining sheet conveying conditions based on an image scanned with use of a scanning device from the conveyed original document.

Related Art

Conventionally, in a field of scanning apparatuses which is configured to scan an image with conveying an original document carrying the image, it is known a technique of determining sheet conveying conditions of the original document based on a scanned image. For example, according to a conventional technique, edges of the original document are extracted from the scanned image, a size and an inclination of the original document are calculated based on the detected edges, and magnification conversion and/or rotation correction is executed based on calculation results.

SUMMARY

In the conventional technique, however, a problem as follows is known. When the original document is scanned with conveying the same, the inclination of the original document may be changed as the original document is conveyed. Such a phenomenon is known as a rotational skew. When the rotational skew occurs, the edge of the original document of the scanned image is curved. Therefore, if an area surrounded by linear lines (e.g., a square area) is extracted from such a scanned image, the extracted image may include images of the edges of the original document or portions of an image formed on the original document may be missing.

In consideration of the above, the present disclosures provide a technique of with which a scanning apparatus configured to scan the original document with conveying the same, an appropriate image processing can be performed in accordance with an original document conveying condition.

According to aspects of the disclosures, there is provided a scanning apparatus, which is provided with a conveyer configured to convey an original document, a scanning device configured to scan the original document conveyed by the conveyer, and a controller. The controller is configured to execute an extraction process which causes the scanning apparatus to extract edges of the original document from the image scanned by the scanning device, an end obtaining process which causes the scanning apparatus to obtain a leading end of the original document and a trailing end of the original document based on the extracted edges in the extraction process, an inclination obtaining process which causes the scanning apparatus to obtain a first inclination of the leading and a second inclination of the trailing end, the first inclination indicating an inclination angle and an inclination direction of the leading end with respect to a direction orthogonal to a conveying direction of the original document, the second inclination indicating an inclination angle and an inclination direction of the trailing end with respect to the direction orthogonal to the conveying direction of the original document, and a determination process which causes the scanning apparatus to determine that a rotational skew has occurred when a difference between the first inclination and the second inclination is greater than a rotational skew threshold, the rotational skew being a change of inclination of the original document during conveyance of the original document.

According to aspects of the disclosures, there is provided a non-transitory computer-readable medium containing instructions to be executed by a controller of a scanning apparatus. The controller executes an extraction process which causes the scanning apparatus to extract edges of an original document from an image scanned by a scanning device, an end obtaining process which causes the scanning apparatus to obtain a leading end of the original document and a trailing end of the original document based on the edges extracted in the extraction process, an inclination obtaining process which causes the scanning apparatus to obtain a first inclination of the leading end and a second inclination of the trailing end, the first inclination indicating an angle and a direction of the leading end with respect to a direction orthogonal to a conveying direction of the original document, the second inclination indicating an inclination angle and a direction of the trailing end with respect to the direction orthogonal to the conveying direction of the original document, and a determination process which causes the scanning apparatus to determine that a rotational skew has occurred when a difference between the first inclination and the second inclination is greater than a rotational skew threshold, the rotational skew being a change of inclination of the original document during conveyance of the original document.

According to aspects of the disclosure, there is provided a method for a scanning apparatus which is provide with an extraction process which causes the scanning apparatus to extract edges of an original document from an image scanned by a scanning device, an end obtaining process which causes the scanning apparatus to obtain a leading end of the original document and a trailing end of the original document based on the edges extracted in the extraction process, an inclination obtaining process which causes the scanning apparatus to obtain a first inclination of the leading end and a second inclination of the trailing end, the first inclination indicating an inclination angle and an inclination direction of the leading end with respect to a direction orthogonal to a conveying direction of the original document, the second inclination indicating an inclination angle and an inclination direction of the trailing end with respect to the direction orthogonal to the conveying direction of the original document, and a determination process which causes the scanning apparatus to determine that a rotational skew has occurred when a difference between the first inclination and the second inclination is greater than a rotational skew threshold, the rotational skew being a change of inclination of the original document during conveyance of the original document.

It is noted that the scanning apparatus according to the present disclosures is configured to scan an original document conveyed by a conveyer, obtain a scanned image, and extract edges of the original document from the scanned image. Further, the scanning apparatus obtains an inclination of leading end (i.e., a first inclination) and an inclination of a trailing end (i.e., a second inclination) of the original document. Then, when a difference between the first inclination and the second inclination is greater than a rotational skew threshold value, the scanning apparatus determines that the rotational skew has occurred.

That is, when the difference between the first inclination and the second inclination is relatively large, it is known that a change of the inclination of the original document from a time when the leading end of the original document passes the scanning position to a time when the trailing end of the original documents passes the scanning position is relatively large. Therefore, in such a case, it is regarded that the rotational skew has occurred. The scanning apparatus according to the disclosures is configured to determine that the rotational skew has occurred when the difference between the first and second inclinations is large. As a result, depending on whether the rotational skew has occurred or not, it is expected that the scanning apparatus executes appropriate processes such as compensation suitable to the rotational skew, notification related to the rotational skew and the like.

BRIEF DESCRIPTION OF THE ACCOMPANYING DRAWINGS

FIG. 1 schematically shows a cross-sectional side view of a scanner showing main components thereof, according to aspects of disclosures.

DESCRIPTION OF ILLUSTRATIVE EMBODIMENT

Hereinafter, an illustrative embodiment of a scanning apparatus according to the present disclosure will be described in detail, referring to the accompanying drawings.

Figure 1:
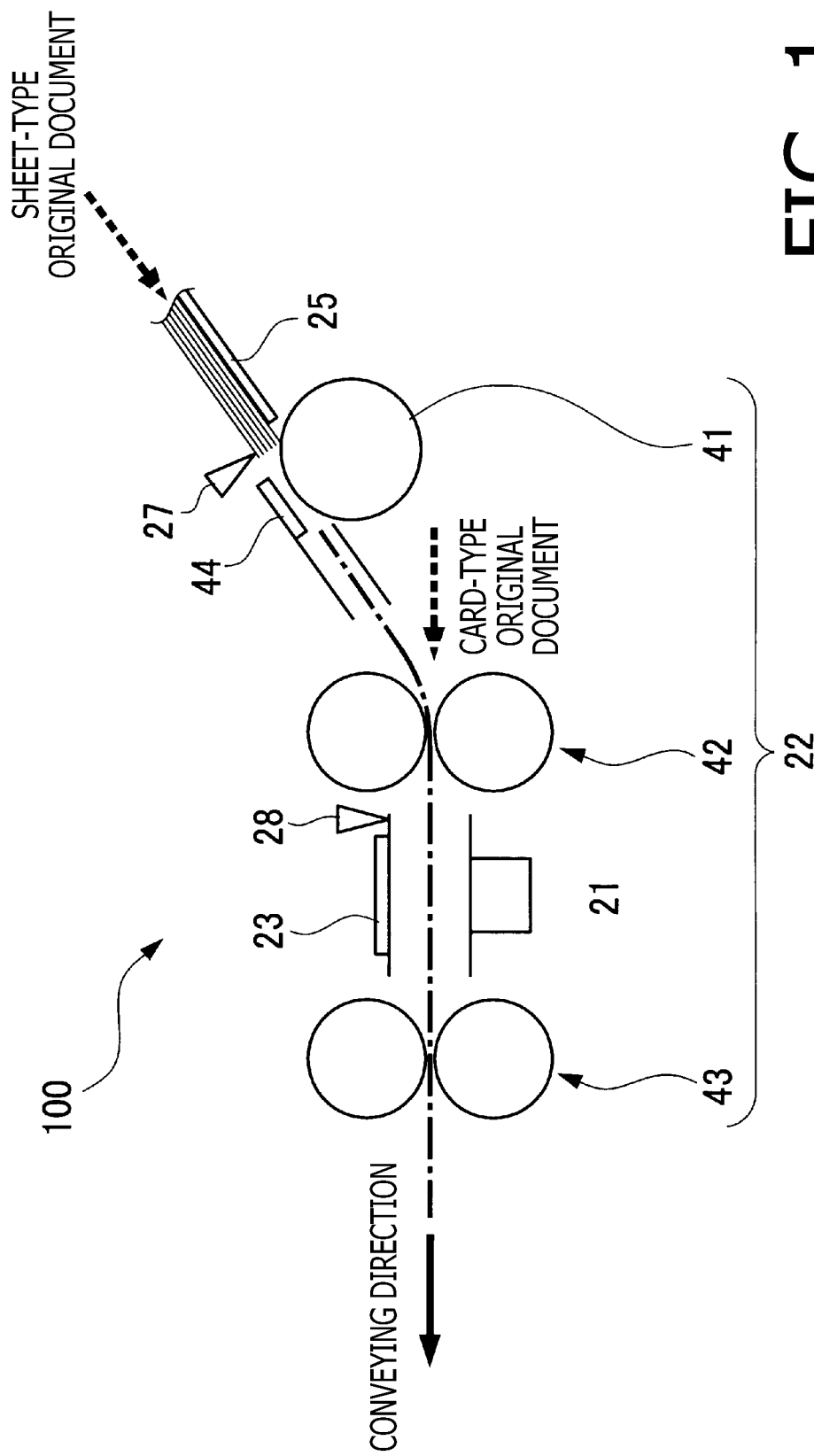

A scanner 100 is an illustrative embodiment according to the present disclosures. As shown in FIG. 1, the scanner 100 has a conveyer 22 configured to convey a scanning head 21 and an original document. The scanner 100 operates such that an image on the original document, which is being conveyed by the conveyer 22, is scanned with the scanning head 21. The scanning head 21 is configured to emit light to an area facing the scanning head 21, receive reflected light, and outputs different signals depending on light amount of received light. The scanner 100 then obtains image data based on the output signals of the scanning head 21. It is noted that the scanner 100 according to the present disclosure may employ a CIS (contact image sensor) type scanner or a CCD (charge coupled device) type scanner. It is noted that the scanning head is an example of a scanning device.

The scanner 100 has a gray plate 23 which is a gray-colored plate member arranged to face the scanning head with a conveying path of the original document sandwiched therebetween. With this configuration, when the scanner 100 operates to scan an image without the original document, the scanner 100 scans the gray plate 23.

As shown in FIG. 1, the scanner 100 has an original document tray 25 on which one of multiple sheets of original document is placed, and two sensors 27 and 28 each of which outputs different signals depending on presence/absence of the original sheet at its position. The sensor 27 is configured to output signals depending on presence/absence of the original sheet placed on the original document tray 25. The sensor 28 is configured to output signals depending on presence/absence of the original document at a position, that is on a downstream side with respect to the sensor 27 and on an upstream side with respect to the scanning head 21, in the conveying direction.

The scanner 100 controls the conveyer 22 to convey the original document along the conveying path, which is indicated by a dotted line in FIG. 1, from the right-hand side to the left-hand side in FIG. 1. The conveyer 22 of the scanner 100 has, as shown in FIG. 1, a feed roller 41, a first conveying roller pair 42 which is arranged on the upstream side with respect to the scanning head 21, and a second conveying roller pair 43 which is arranged on the downstream side with respect to the scanning head 21, in this order from the upstream side to the downstream side in the conveying direction. Further, the scanner 100 has a separation pad 44 arranged at a position facing the feed roller 41. The feed roller 41 is configured to feed, in association with the separation pad, one sheet of the original documents placed on the original document tray 25 toward the conveying path.

Figure 2:
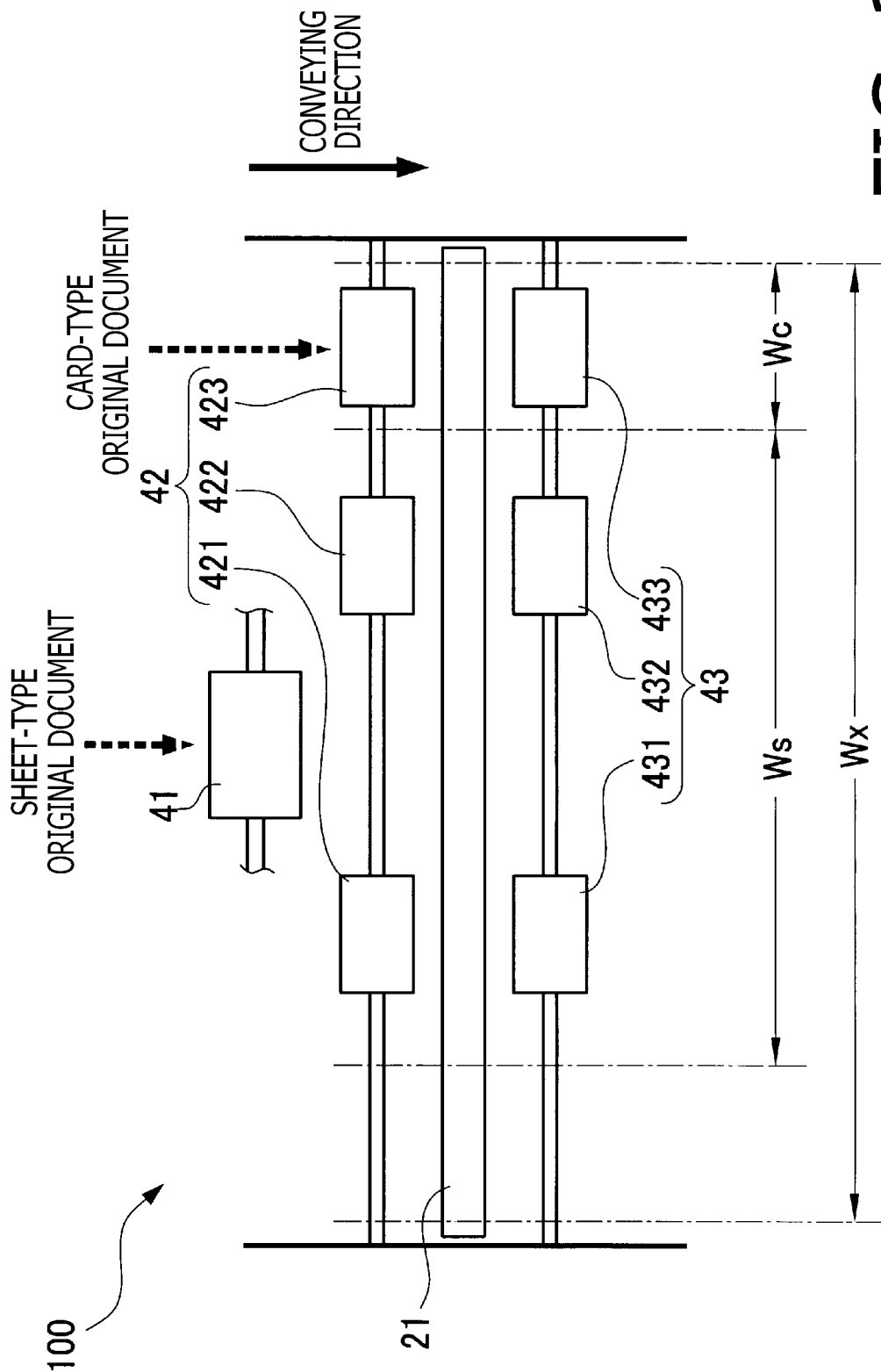
FIG. 2 is a chart illustrating a configuration of conveying original documents of the scanner according to aspects of the disclosures.

Next, a structure of the first conveying roller pair 42 and a structure of the second conveying roller pair 43 will be described. The first conveying roller pair 42 is configured such that, as shown in FIG. 2, a plurality of miler pairs (i.e., upper rollers and lower rollers) are arranged along an axial direction of shafts of the rollers. In other words, the first conveying roller pair 42 has two roller shafts, a plurality of rollers are secured to each shaft with certain distances between adjacent rollers. The plurality of rollers secured to one of the two shafts, and the plurality of rollers secured to the other of the two shafts are arranged to face each other so as to form a plurality of roller pairs. The second conveying roller pair 43 has the same structure. FIG. 2 shows the arrangement of the rollers viewed from the above of FIG. 1, the left-hand side of FIG. 1 corresponding to the lower-side of FIG. 2.

The original document is conveyed in a direction from the upside of FIG. 2 to the down side of FIG. 2. According to the illustrative embodiment, each of the first conveying roller pair 42 and the second conveying roller pair 43 has three roller pairs (421-423 and 431-433) arranged in the axial direction. The original document is nipped by the roller pairs 421-423 and 431-433 and conveyed. Specifically, the first conveying roller pair 42 has roller pairs 421, 422 and 423, while the second conveying roller pair 43 has roller pairs 431, 432 and 433 (sec FIG. 2).

Each of the roller pairs (421-423 and 431-433) has a driving roller and a driven roller which is arranged to face the driving roller. The driving rollers define one of the first conveying roller pair 42 or the second conveying roller pair 43, and secured to the same shaft and driven to rotate simultaneously. An arrangement of the rollers (421-423) of the first conveying roller pair 42 in the axial direction, and an arrangement of the rollers (431-433) of the second conveying roller pair 43 in the axial direction are the same. It is noted that the driven rollers may be secured to the same shaft, or different shafts.

The scanner 100 is configured such that a card-type original, which is a small-sized original document, can be loaded to the scanner 100 from a portion different from the original document tray 25. It is noted that the card-type original is, for example, a card size original document such as a name card, a driver's license, a member's card or the like. Such a card-type original is to be inserted, one by one, in the scanner 100 through a dedicated insertion slot in a direction of an arrow shown in FIG. 1 and FIG. 1 with an indication of "card-type original document."

The conveying path of the card-type original is indicated by a range Wc in FIG. 2. As shown in FIG. 2, the conveying path of the card-type original is arranged at an end portion in a direction perpendicular to the conveying direction. In the conveying path of the card-type original, the roller pair 423 of the first conveying roller pair 42 and the roller pair 433 of the second conveying roller pair 43 are arranged. That is, the card-type original inserted through the dedicated insertion slot is directly inserted in the nip of the roller pair 423 of the first conveying roller pair 42 without being fed by the feed roller 41, and is conveyed by the roller pair 423 and the roller pair 433.

A sheet-type original, which is a non-card-type original document, is typically placed in the original document tray 25 such that multiple sheets of the original documents are collectively placed on the original document tray 25 as a stack of sheets. The scanner 100 is configured to feed the original documents one by one from the original document tray 25, with user of the feed miler 41, in a direction of an arrow shown in FIG. 1 and FIG. 2 with an indication of "sheet-type original document."

The conveying path of the sheet-type original is defined to be centered. That is, the sheet-type original is conveyed to be centered, in a direction perpendicular to the conveying direction, within a range Wx (see FIG. 2) which is a scannable range of the scanning head 21. For example, when the width of the original document is substantially equal to or less than a width of an A6 size (105 mm×148 mm) sheet, the original document is conveyed by the for roller pairs 421, 422, 431 and 432, and the original document proceeds within a range Ws shown in FIG. 2.

According to the illustrative embodiment, the feed roller 41 is arranged to be centered within the range Wx, and the roller pairs 421 and 422, and the roller pairs 431 and 432 are arranged at positions symmetrical with respect to the center of the range Wx. In other words, the roller pairs 421 and 422 are arranged at position having the same distanced from the center of the range Wx in the axial direction. So are the roller pairs 431 and 432. With the above configuration, a difference of conveying speeds in right and left sides of the original document, which is centered within the range Wx and conveyed by the four roller pairs 421, 422, 431 and 432, hardly occurs.

When the width of the original document is greater than the range Ws (e.g., when the original document is A4 size (210 mm×297 mm) or larger), the original document is conveyed with use of the roller pairs 423 and 433 as well. In such a case, arrangement of members that convey the original document are asymmetrical in the right-left direction with respect to the center of the range Wx, and there may occur a difference of conveying speeds in right and left sides of the original document. If the difference of conveying speeds occurs, an inclination of the original document may easily change during conveyance of the original document. In the following description, a phenomenon that the inclination of the original document changes during conveyance and scanning of the original document will be referred to as rotational skew.

Figure 3:
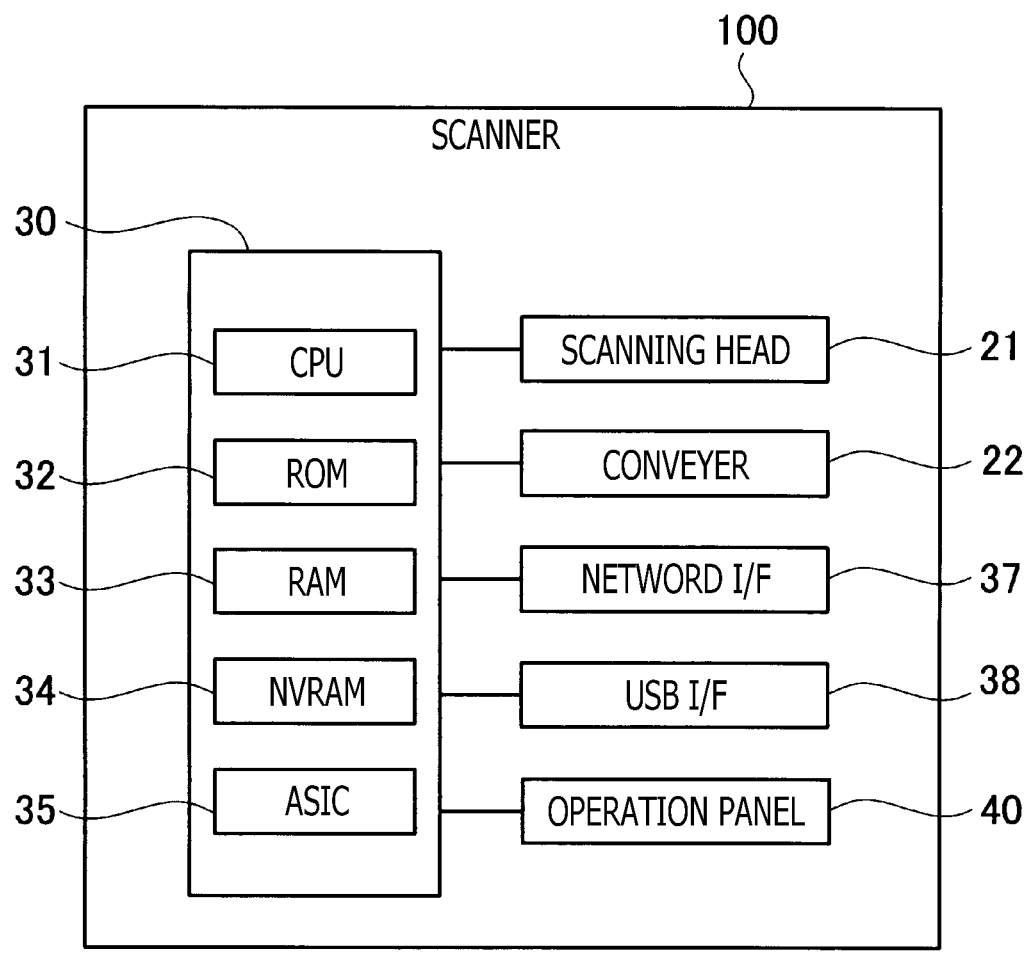
FIG. 3 is a block diagram showing an electric configuration of the scanner according to aspects of the disclosures.

As shown in FIG. 3, the scanner 100 has a controller 30 which is provided with a CPU (central processing unit) 31, a ROM (read only memory) 32, a RAM (random access memory) 33, an NVRAM (non-volatile RAM) 34, an ASIC (application specific integrated circuit) 35. The scanner 100 further has the scanning head 21, the conveyer 22, a network interface 37, a USB (universal serial bus) interface 38 and an operation panel 40, which are electrically connected to the controller 30.

The ROM 32 stores control programs that control operations of the scanner 100, setting parameters, initial values and the like. The RAM 33 is used as a work area in which the control programs art retrieved and/or storage area use to temporarily store data when the control programs are executed. The CPU 31 controls components of the scanner 100 with controlling the RAM 33 and/or NVRAM 34 to store results of executed control programs.

It is noted that the CPU 31 is an example of a controller. It is noted that the CPU 31 may serve as the controller, or the ASIC 35 may serve as the controller. It is noted that the term controller 30) in FIG. 3 is a collective name including hardware used to control the scanner 100, and the term controller 30 necessarily mean a single unit of hardware.

The network interface 37 is hardware used to execute communication with another device connected through a network with use of a LAN (local area network) cable or the like. The USB interface 38 is hardware used to execute communication with a device connected through a USB cable or the like. The operation panel 40 has a display and input buttons, and displays messages or the like for a user, and receive user input through the input buttons.

The scanner 100 according to the illustrative embodiment is configured to execute a scanning process of the sheet-type original, in which the scanner 100 conveys the sheet-type original and scan an image thereon to obtain image data, generate output data based on the image data, and output the thus generated output data to a destination designated by the user. It is noted that the output data may have any one of generally used image format such as JPEG, GIF, bitmap or the like.

For example, when the scanner 100 receives a scanning instruction when the sheet-type original is set to the original document tray 25, the scanner 100 controls the conveyer 22 to convey the sheet-type original from the original document tray 25, and controls the scanning head 21 to scan the image on the sheet-type original being conveyed.

According to the illustrative embodiment, based on, for example, the output signal of the sensor 28, the scanner 100 starts scanning with use of the scanning head 21 before the leading end of the original document reaches a position of the scanning head 21. Further, the scanner 100 stop scanning after the trailing end of the original document has passed the position of the scanning head 21. According to the illustrative embodiment, the scanner 100 obtains the image data 50 within the scannable range Wx of the scanning head 21, from an upper portion to the lower portion in FIG. 4.

Figure 4:
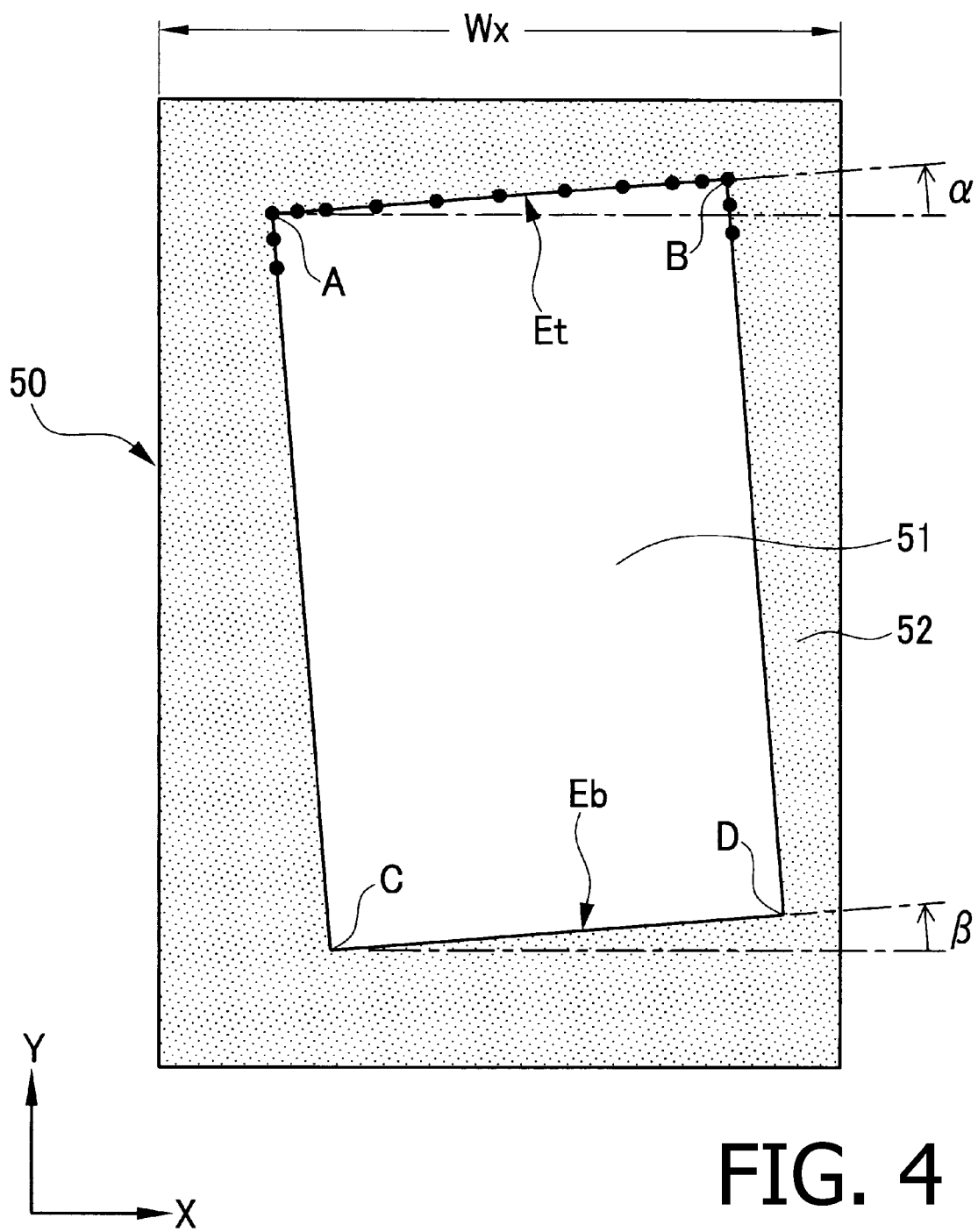
FIG. 4 shows an image represented by an example of image data.

As a result, the image data 50 as obtained includes a gray area 52, which is indicated by dot hatching in FIG. 4, around an original document area 51. The gray area 52 represents image data 50 of a background, which is obtained by scanning an image outside the original document. In other words, the gray area 52 represents the image data 50 when the scanning unit 21 scans the image of the gray plate 53 which is arranged to face the scanning unit 21.

Next, the scanner 100 generates the output data, which is the data to be output, based on the thus obtained image data 50, and transmits the output data thus generated to the destination which has been designated by the scanning instruction. According to the illustrative embodiment, as a process of generating the output data, the scanner 100 executes trimming to extract an output image from the image data 50, and rotation to compensate for inclination of the extracted output image.

According to the illustrative embodiment, the scanner 100 determines a range which is considered to be the original document area 51 based on the image data 50, and determines the original document area 51 as the output range. Then, the scanner 100 eliminates portions of the image data other than the output range, thereby extracting the output image which represents the image within the output range. Further, based on the output image, when the scanner 100 determines that the original document is inclined with respect to the conveying direction, the scanner 100 determines a rotation amount for correcting the inclination of the original document, and apply rotation to the output image. It is noted that the "rotation" has an amplitude and a direction. According to the illustrative embodiment, the amplitude of the rotation is represented by an absolute value of a rotation angle of the original document with respect to the conveying direction, while the direction (i.e., a rotation direction) is opposite to the inclination direction of the original document and represented by a sign (plus or minus) of the rotation angle.

Figure 5:
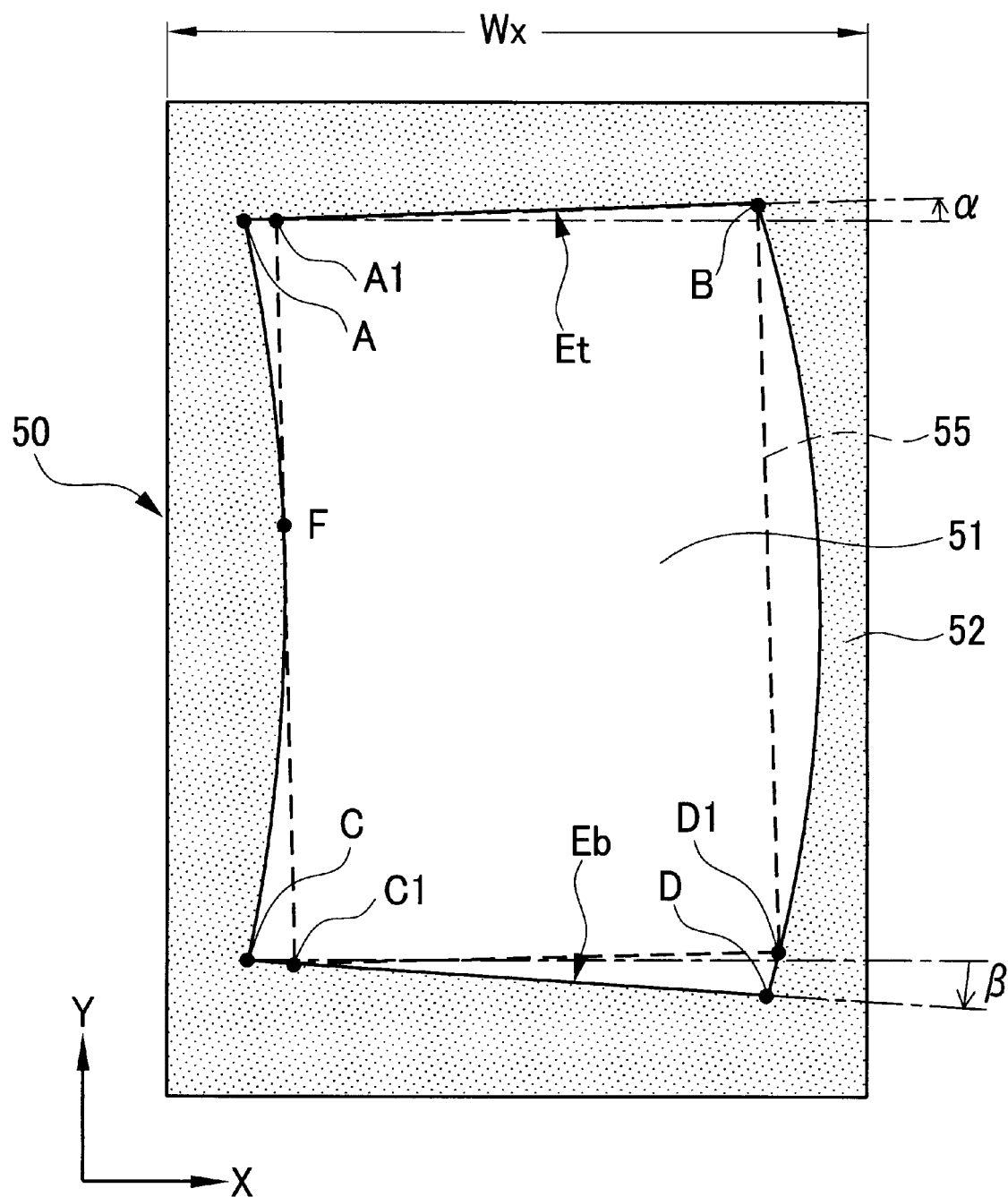
FIG. 5 shows another image represented by an example of the image data.

In the following description, positions of points and lines in the image data 50, as shown in FIG. 4, will be expressed using X-Y coordinates within an X-Y plane for descriptive purpose. In FIG. 5, the image data 50 is shown such that each line of the image scanned with the scanning head 21 is displayed to extend in a right-left direction (i.e., in a direction perpendicular to the scanning head 21), a line of image scanned earlier being arranged on an upper side. A left end of the finally obtained line of the image data 50 is defined as an origin and an X-axis and a Y-axis of an orthogonal coordinate system are arranged. The X-axis is a direction in which the scanning head 21 extends, which is orthogonal to the conveying direction of the original document. The Y-axis is an opposite direction with respect to a proceeding direction of the scanning operation. Thus, a value of the Y-axis increased from the finally obtained line to the firstly obtained line. It is noted that the above definition of the X-Y coordinate system is only for a descriptive purpose, and can be modified. For example, a direction of the Y-axis may be opposite to the above-defined direction.

Firstly, the scanner 100 extracts edges of the original document from the obtained image data 50, as shown by black dots in FIG. 4, in order to determine the output range. The edges can be detected as positions where each point (pixel) of the image data 50 exhibits a value (e.g., a brightness value, one of amplitude of RGB components) exceeds a particular threshold value when viewed from an outer side to an inner side. For example, the scanner 100 binarizes the brightness value of each point (pixel) within the image data 50 checks the binarized values from the outer side to the inner side of the image data 50 to find a boundary between the gray area 52 and the original document area 51, and obtains coordinates of the boundary. It is noted that the scanner 100 may be configured to extract the edges from a portion which have already been scanned concurrently with the scanning operation.

Further, the scanner 100 obtains, based on the extracted edges, positions of a leading end Et, a trailing end Eb, and four corners (points A, B, C, D in FIG. 4) which are ends of the leading end Et and the trailing end Eb. It is noted that the leading end Et is an end of the original document firstly scanned as the original document is conveyed, while the trailing end Eb is an end of the original document lastly scanned as the original document is conveyed.

According to the illustrative embodiment, the scanner 100 calculates an approximate line segment based on multiple edges of the leading end portion of the image of the original document and determines the approximate line segment as the leading end Et. Further, the scanner 100 obtains the corners of the leading end of the original document from both ends of the approximate line segment (i.e., the leading end Et). Alternatively, the scanner 100 may obtain the positions of the corners as positions at which extending direction of the extracted edge change, and then define the leading end Et as a line segment connecting the obtained corners. The trailing end Eb and the corners of the trailing end can be obtained in a similar manner.

Next, the scanner 100 according to the illustrative embodiment obtains the inclinations of the leading end Et and the trailing end Eb. Each of the inclination includes an angle formed between the end and the X-axis, and a direction (i.e., the sign of the rotation angle). For example, when the leading end Et is represented by an equation $Y=\alpha x+p$, the inclination of the leading end Et is represented by "$\alpha$" in the above equation. Similarly, when the trailing end Eb is represented by an equation $Y=\beta x+q$, the inclination of the trailing end Eb is represented by "$\beta$" in the equation.

Further, the scanner 100 according to the illustrative embodiment is configured to compare a difference between the inclinations of the leading end Et and the trailing end Eb with a particular rotational skew threshold. An example of the rotational skew threshold is three degrees. Thus, the scanner 100 obtains the difference $\delta$ between the inclinations $\alpha$ and $\beta$ ($\delta=\alpha-\beta$), and determines whether an absolute value of $\delta$ corresponds to the rotation angle of less than three degrees. When the absolute value of $\delta$ corresponds to the rotation angle of less than three, the scanner 100 determines that the rotational skew has not occurred.

For example, when the inclination $\alpha$ of the leading end Et and the inclination $\beta$ of the trailing end Eb is relatively small as shown in FIG. 4, the absolute value of the difference $\delta$ is small. In such a case, the scanner 100 determines that the inclination of the original document has changed little during conveyance thereof, or the rotation skew has not occurred.

When the scanner 100 determines that the rotational skew has not occurred, the scanner 100 assumes, for example, that an area enclosed in all the surrounding edges is an area of the image of the original document, and determines the area as the output range. Alternatively, the scanner 100 may determine an area surrounded by the leading end Et, the trailing end Eb, and line segments respectively connecting both ends of the leading end Et and the trailing end Eb as the output range. In the example shown in FIG. 4, the output range is a rectangular area which substantially coincides with the original document area 51. When the output range is determined, the scanner 100 eliminates portion of image data 50 outside the output range by trimming, thereby extracting an output image of the output range from the image data.

It is noted that, even when the scanner 100 determines the rotational skew has not occurred, when the inclination α or β corresponds to an angle equal to or greater than a prescribed angle, the scanner 100 applies an inclination compensation process to the output image extracted from the image data 50. For example, when the absolute value of the inclination α which corresponds to the inclination angle of the leading end Et exceeds one degree, the scanner 100 determines a rotation amount based on the inclination α of the extracted output image, and applies the inclination compensation process. According to the illustrative embodiment, the rotation amount is determined such that the amplitude of the rotation amount is the absolute value of the inclination α and the rotation direction is a direction opposite to an inclination direction of the inclination α. Alternatively, the rotation amount may be determined based on the inclination β of the trailing end Eb. Further alternatively, the rotation amount may be determined based on an average value of the inclinations α and β. After the rotation amount is determined and the compensation process is executed, the scanner 100 generates the output data based on the output image to which the compensation process has already been applied, and transmits the generated output data to the destination.

When the difference between the inclinations α and β is relatively large as shown in FIG. 5, the scanner 100 determines that the inclination of the original document has changed during conveyance of the original sheet, or the rotational skew has occurred. In particular, when the inclination α and the inclination β are directed to opposite directions (i.e., opposite signs) as shown in FIG. 5, the scanner 100 determines that the rotational skew has occurred.

When the rotational skew has occurred, even if the original document is rectangular, the original document area 51 of the image data 50 does not have a shape surrounded by straight line segments. Therefore, in such a case, the scanner 100 determines an area which is different from the original document area 51 as the output range to be extracted as an output image from the image data 50. For example, as indicated by broken lines in FIG. 5, a rectangular area, which assumed to be an area of the image of the original document, of the image data 50 is determined as the output range 55. A method of determining the output range 55 will be described later. Thus, the scanner 100 extracts the output image corresponding to the output range 55 from the image data 50, and applies, if necessary, the rotation process to the extracted output image to generate the output data.

Next, an output data generating process which is a process of realizing the above-described scanning operation in the scanner 100 according to the illustrative embodiment, and is executed when the sheet-type original is scanned, will be described, referring to FIG. 6.

When an instruction to start scanning of the sheet-type original is received, the scanner 100 starts conveying and scanning the sheet-type original, and obtains the image data 50 as shown in FIG. 4 or 5. It is noted that the output data generating process will be executed by the CPU 31 in response to start of obtaining the image data 50 as the scanning operation is started.

When the output data generating process is started, the scanner 100 firstly obtains the image data 50 for one sheet of the original document (S101). Then, the scanner 100 extracts edges of the original document in the image data 50 (S102). In S102, the scanner 100 extracts at least a leading edge at the leading end portion, and an trailing edge at the trailing end portion. Regarding other edges, they may also be extracted in S102, or may not be extracted in S102 and extracted later when necessary. It is noted that a process in S102 is an example of the extracting process.

In S104, the scanner 100 obtains the inclinations α and β of the leading end Et and the trailing end Eb, respectively, based on the edges extracted in S102. According to the illustrative embodiment, the scanner 100 obtains equations of approximate lines based on the extracted edges (i.e., the edges at the leading end portion and the trailing end portion), and obtains the inclinations of the approximate lines, respectively. It is noted that S104 is an example of the inclination obtaining process.

Next, the scanner 100 determines whether the absolute value of the difference between the obtained inclinations α and β is greater than the particular rotational skew threshold (S105). It is noted that a process in S105 is an example of a determination process.

When it is determined that the absolute value of the difference of the inclinations α and β is not greater than the particular rotational skew threshold (S105: NO), since the inclination of the original document has not substantially changed before and after conveyance of the original document, the scanner 100 determines that the rotational skew has not occurred. Then, the scanner 100 determines whether the absolute value of the inclination α is smaller than a prescribed value (S106).

When the scanner 100 determines that the absolute value of the inclination α is smaller than the prescribed value (S106: YES), the scanner 100 executes the trimming based on the edges of the original document extracted in S102, and extracts the output image (S108). For example, when the absolute value of the inclination α is less than one degree, the original document area 51 is not substantially inclined. In such a case, the scanner 100 determines that the original document area 51 surrounded by the edges is the output range 55 and extracted the same from the image data 50 as the output image. Further, the scanner 100 generates the output data from the output image (S109), and terminates the output data generating process. It is noted that, instead of apply trimming based on the surrounding edges, an area defined by connecting both ends of the leading end Et and the trailing end Eb may be extracted as the output image.

When the scanner 100 determines that the absolute value of the inclination α is not smaller than the particular value (S106: NO), the scanner 100 applies trimming as in S108 to extract the output image from the image data, and then, determines the inclination α as the inclination of the original document, and applies rotation to compensate for the inclination (S110). After the compensation, the scanner 100 generates the output data based on the compensated image (S109), and terminates the output data generating process. It is noted that the determination in S106 and the rotation in S110 can be executed based on the inclination β of the trailing end Eb instead of the inclination α of the leading end Et.

When it is determined that the difference between the inclination α of the leading end Et and the inclination β of the trailing end Eb is greater than the rotational skew threshold (S105: YES), the scanner determines there is a possibility that the rotation skew has occurred. There is another possibility that the shape of the original document is not rectangular. For example, when the original document does not have a rectangular shape due to turned-down of the corner or breakage of an end portion, the original document area 51 of the image data 50 may not have the rectangular shape even if the rotational skew has not occurred. That is, in such a case, even if the rotation skew has not occurred, there is a possibility that the difference of the inclinations α and β may be relatively large.

The scanner 100 determines whether the size of the original document is small (S112). In this steps, for example, based on the length of the leading end Et in the X-axis direction, the scanner 100 determines whether the width of the original document (i.e., the length of the original document in a direction perpendicular to the conveying direction) is less than a particular width. The "particular width" is determined such that, when an original document having the particular width is conveyed, it is very likely that the original document contacts the roller pair 423 or the roller pair 433 (see FIG. 2) of the conveyer 22. Further, based on the length between the leading end Et and the trailing end Eb in the Y-axis direction, the scanner 100 determines whether the length of the original document in the conveying direction is shorter than a particular length. The "particular length" is determined such that, when an original document has the particular length is conveyed, side ends of the original document may contact a guide or the like to regulate the conveying path even if the inclination of the original document is relatively small.

When the width of the original document is less than the particular width, a possibility that the original document contacts the roller pair 423 or the roller pair 433 is relatively low, and thus the possibility of occurrence of the rotational skew is low. Further, when the length of the original document is shorter than the particular length, a possibility that the original document contact the guide or the like is low, and thus a possibility of occurrence of the rotational skew is low. Although, as above, the possibility of the rotational skew is low, if the difference between the inclinations α and β is large, it is very likely that the shape of the original document is not the rectangle.

When it is determined that the size of the original document is relatively small (S112: YES), the scanner 100 applies trimming to the image data 50 based on the edges of the image of the original document (S108), generates the output data (S109) and terminates the output data generating process. As above, even if the difference between the inclinations α and β is greater than the rotational skew threshold value, when the size of the original document is smaller than a particular size, the scanner determines that the rotational skew has not occurred.

When it is determined that the size of the original document is not small (S112: NO), the scanner 100 determines whether at least one of the side-ends is linear (S113). The side-ends are the sides of the original document other than the leading end Et and the trailing end Eb. The scanner extracts the edges corresponding to the side-ends based on change of values of the image data 50 in the X-axis direction, and determines whether the side-ends have linearity based on the extracted edges. For example, the scanner 100 determines that a side-end does not have a linearity when a distance between a line connecting the corners at both ends of the approximate lines or the side-ends (e.g., a line AC) and the farthest edge is greater than a particular distance. Alternatively, the linearity may be determined based on a coefficient of correlation when the edges of the side-ends are expressed by collinear approximation.

When the rotational skew occurs, both the side-ends are curved. Therefore, in such a case, if at least one of the side-ends is linear, it is very likely that the shape of the original document is not rectangular. In such a case, for example, it is likely that the original document is of an irregular shape, or has breakage and/or folding-down. Accordingly, when it is determined that at least one of the side-ends is linear (S113: YES), the scanner 100 applies trimming to the image data 50 based on the edges of the image of the original document (S108), generates the output data (S109) and terminates the output data generating process. That is, even when the difference between the inclinations α and β is greater than the rotational skew threshold value, if an edge of at least one of the side-ends is linear, the scanner 100 determines that the rotational skew has not occurred.

When it is determined that none of the side-ends is not linear (S113: NO), the scanner 100 determines that the rotational skew has occurred. Then, the scanner 100 applies a rotational skew handling process to the image data 50 which the scanner 100 has determined that the rotational skew has occurred. In the rotational skew handling process, the output range 55 and an amount of rotation to compensate for the inclination with respect to the image data 50 are determined.

Figure 7:
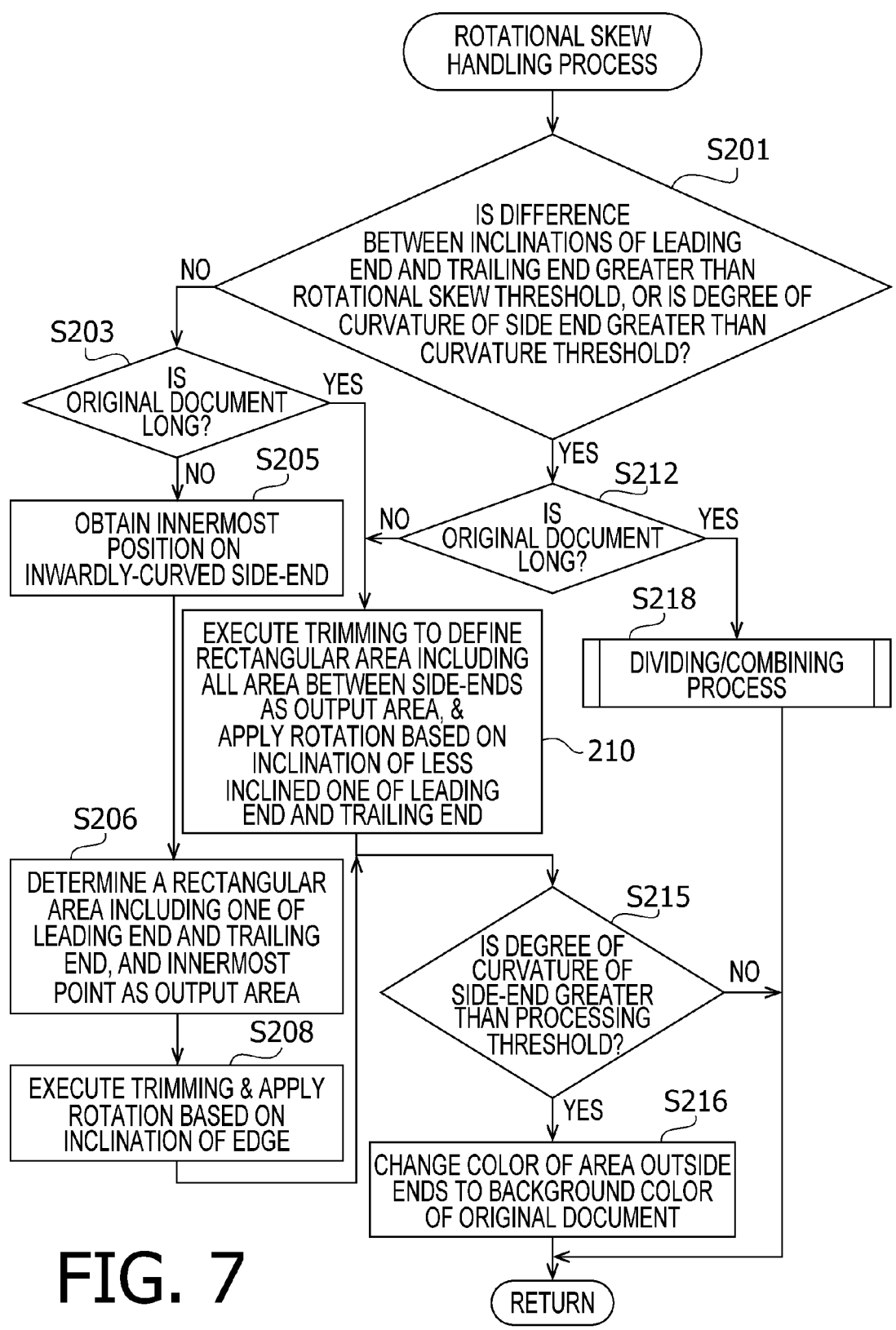
FIG. 7 is a flowchart illustrating a rotational skew handling process according to aspects of the disclosures.

FIG. 7 shows a flowchart illustrating the rotational skew handling process. When the rotational skew handling process is invoked, the scanner determines whether one of (a) the absolute value of the difference between the inclinations α and β is greater than the inclination difference threshold value, or (b) the curved amount of the side-end is greater than the curvature threshold value is satisfied (S201).

It is noted that the inclination difference threshold value is greater than the rotational skew threshold value referred to in S105, and is used to determine whether the degree of the rotation skew is relatively large or not. Further, the curvature amount represents, for example, a distance between a line connecting one end of the leading end Et and one end of the trailing end Eb and a farthest portion of the side-end. The curvature threshold value is used to determine whether the degree of the curvature is relatively large or not.

When it is determined that the absolute value of the difference between the inclinations α and β is not greater than the inclination difference threshold value, and when it is determined that the curvature amount of the side-end is not greater than the curvature threshold value (S201: NO), the scanner 100 determines whether the original document is a long document (S203). For example, the scanner 100 determines whether a distance of the original document in the conveying direction is longer than the particular length threshold value, based on the distance between the leading end Et and the trailing side end Eb in the Y-axis direction. Alternatively, the scanner 100 may obtain the length of the original document when the scanning is performed based on the output signals from the sensor 28, the scanning setting regarding the original document the user input through the operation panel 40, and the like, and make the determination in S203 based on the thus obtained length of the original document.

When it is determined that the original document is not long (S203: NO), the scanner 100 determines a rectangular area which is enclosed within the original document area 51 surrounded by the edges in the image data 50 as the output range 55. In this case, a possibility that an image of the edges remains in the output image is low, and a good-looking image can be output. It is noted that, in view of suppressing information from missing, it is preferable to determine a largest rectangle enclosed within the original document area 51 is determined as the output range 55.

Referring to FIG. 5, an example of determination of the output range 55 will be described. The scanner 100 firstly obtains the innermost position of the inwardly curved side-end (S205). It is noted that the scanner has obtained each side of the original document area 51 as shown in FIG. 5 based on the edges extracted from the image data 50. In this example, the left-hand side one (i.e., side AC) of the both side-ends is the inwardly curved side-end, and the innermost point of the side AC is a point F, which is, in this example, the portion of the side AC having the largest X-axis coordinate. According to another aspect, the point F can be defined as a tangent point at which a line parallel to a line connecting points A and C contacts the side AC.

Next, the scanner 100 determines a rectangular area including one of the leading end Et and the trailing end Eb of which the absolute value of the inclination is smaller (e.g., the side Et in this example) and the innermost point F as the output area 55 (S206). For example, the scanner 100 compares the absolute value of the inclination $\alpha$ with the absolute value of the inclination $\beta$, and based on the inclination of the side forming a smaller angle with respect to the X-axis (i.e., one of the leading end Et and the trailing end Eb), determines the output range 55.

Specifically, a point A1 is defined as a point at which a line orthogonal to the leading end Et and passing the point F and the leading end Et intersect with each other, and a point C1 is defined as a point where the above line, which is orthogonal to the leading end Et and passing the point F, intersects with the trailing end Eb. Further, a point B is defined as a point which is an end of the leading end Et on a side-end which is not inwardly curved. Then, a rectangle of which the points A1, C1 and B are apexes thereof is determined as the output range 55. Given that a point where a line passing the point B and parallel to a line segment A1-C1 and a line passing the point C1 and parallel to the leading end Et intersect which each other is a point D1, the output range 55 is defined as a rectangle A1-C1-D1-B.

Then, the scanner 100 applies trimming to the image data 50 so as to obtain the output image by extracting the image of the output range 55 determined in S206, and applies rotation to the obtained output image based on the inclination amount of the end constituting one side of the output range 55 (e.g., the inclination $\alpha$ of the leading end Et) (S208). Thus, the scanner 100 compensates for the output image so that the leading end Et as compensated extends in the X-axis direction.

It is noted that, when the absolute value of the inclination $\beta$ of the trailing end Eb is smaller than that of the inclination $\alpha$ of the leading end Et, the scanner 100 may determine that the trailing end Eb as one side of the output range 55 instead of the leading end Et. In such a case, the scanner 100 may apply rotation based on the inclination $\beta$ in S208.

In S206 and S208, the scanner 100 determines the output range 55 and the rotation amount by referring to both the inclinations $\alpha$ and $\beta$, and selecting one of them. That is, according to the illustrative embodiment, the scanner 100 used both the inclinations $\alpha$ and $\beta$ in determining at least one of the output range 55 and the rotation amount. It is noted that, comparing and selecting one of the inclinations $\alpha$ and $\beta$, and determining the output range and the rotation amount based on the selected inclination is also considered to use both the inclinations $\alpha$ and $\beta$. For example, by selecting the inclination having a smaller absolute value, it becomes likely that missing of information can be suppressed and less distorted output image with respect to the original image on the original document is obtained.

Further, by determining the output range 55 so as to be enclosed within an area surrounded by the edges, a possibility that an image of the edges remain in the output image is low, which suppress bad-looking of the output image.

It is noted that the scanner 100 may determine the end constituting the output range 55 and the rotation amount for the inclination compensation based on an inclination of one of the leading end Et and the trailing end Eb of which the distance with respect to the innermost position obtained in S206 is longer. Determined in such a manner, it is likely that portions of the original document 51, which are eliminated from the output range 55, are reduced, and that the rotation amount is relatively small.

When the scanner 100 determines that the original document is a long one (S203: YES), a size of the output range 55 in a direction perpendicular to the conveying direction of the original document is made larger in comparison with a case where the original document having the same width but not the long document.

For example, the scanner 100 determines a rectangular area including all the area, in the image data 50, surrounded by the edges of the side-ends as the output range 55. Further, the scanner 100 determines the output range 55 and the rotation amount based on one of the inclinations $\alpha$ and $\beta$ having a smaller absolute value. The scanner 100 applies trimming with respect to the image data to obtain the output image corresponding to the output range 55, and applies rotation based on the rotation amount as determined to generate the output data (S210). It is noted that steps S208 and S210 are examples of a rotation compensation process.

Figure 8:
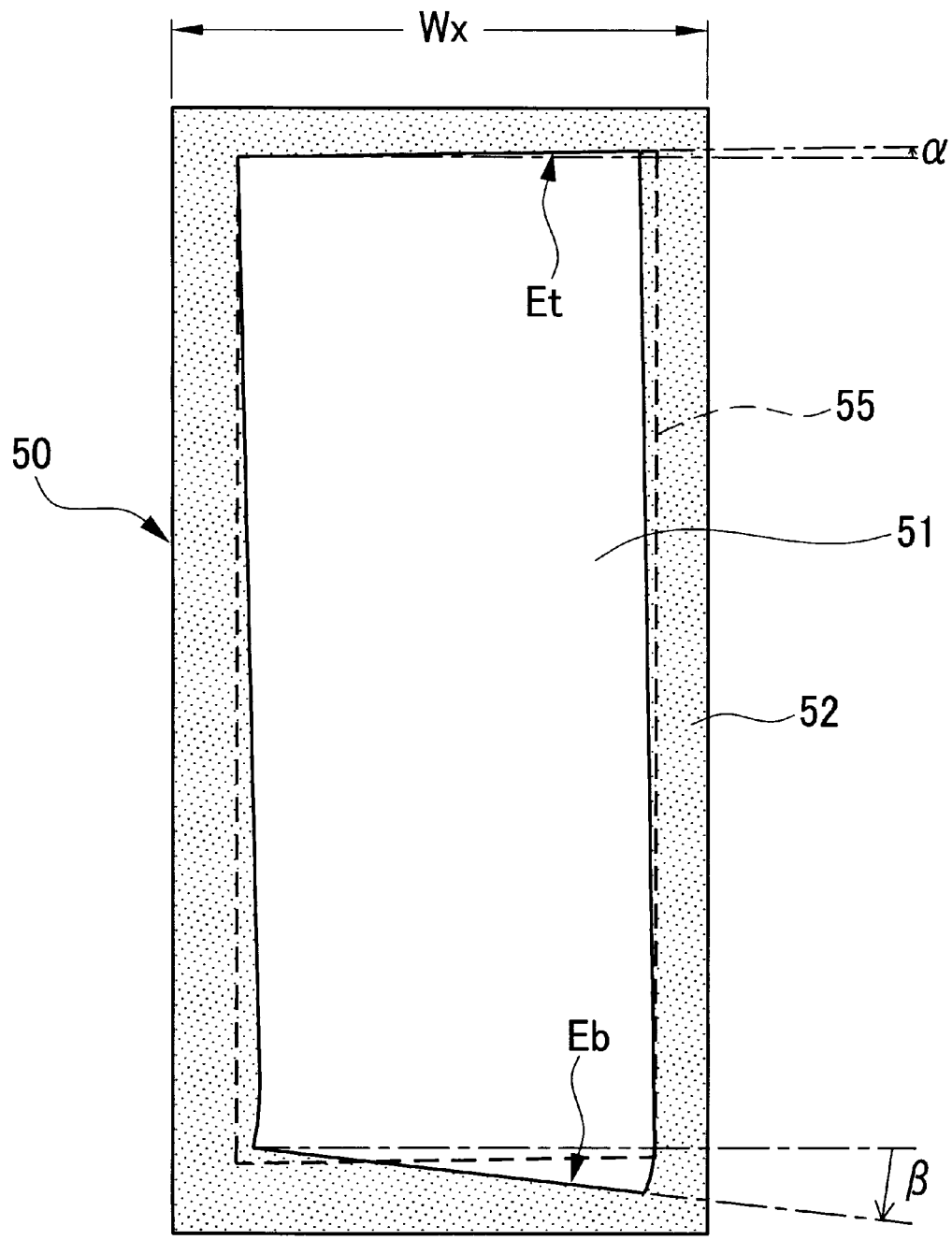
FIG. 8 shows an example of an output range of an image represented by the image data.

As shown in FIG. 8, when the original document is a long document of which the length is more than two times the scannable range Wx of the scanning head 21, if the output range is defined inside the edges as in S206, portions of the original document area 51 which are eliminated by trimming may become too large. Accordingly, when the original document is long, the scanner 100 increases the size of the output range 55 at least in the width direction such that the output range 55 is defined as a range outside the range surrounded by the side-ends.

In this case, the scanner 100 determines an end constituting one side of the output range 55 and the rotation amount for the inclination compensation by comparing the absolute values of the inclinations $\alpha$ and $\beta$.

For example, when the absolute value of the inclination $\alpha$ is smaller than that of the inclination $\beta$, the scanner 100 determines a rectangular area surrounded by two lines which are orthogonal to the leading end Et and contact both side-ends of the image of the original document from outside as the output range 55. The scanner 100 executes the inclination compensation with respect to the output image obtained from the output range 55 based on the inclination amount a. With this configuration, it is expected that missing of information from the original document area 51 is suppressed. Further, the scanner 100 enlarges the output range 55 as the original document is longer so that missing of information is well suppressed. Alternatively, the scanner 100 may determine that output range 55 so as to enclose all the area surrounded by the leading end Et, the trailing end Eb and both side-ends.

When the scanner 100 determines at least one of (a) the absolute value of the difference between the inclinations $\alpha$ and $\beta$ is greater than the inclination difference threshold value, and (b) a curved amount of a side-end is greater than the curvature threshold value (S201: YES), the scanner determines whether the original document is long (S212). It is noted that, in S212, the scanner 100 determines whether the length of the original document in the conveying direction is longer than a division threshold value. The division threshold value is a threshold value defined separately from the length threshold value used in S203. In a particular embodiment, the division threshold value is the same as the length threshold value.

When it is determined that the original document is not the long document (S212: NO), the scanner 100 executes trimming and rotation to generate the output data (S210). For example, the scanner 100 extracts a rectangular area including the area surrounded by the edges from the image data 50 as the output image, and applies rotation to the output image based on an inclination which the smaller one of the absolute values of the inclinations α and β.

Figure 9:
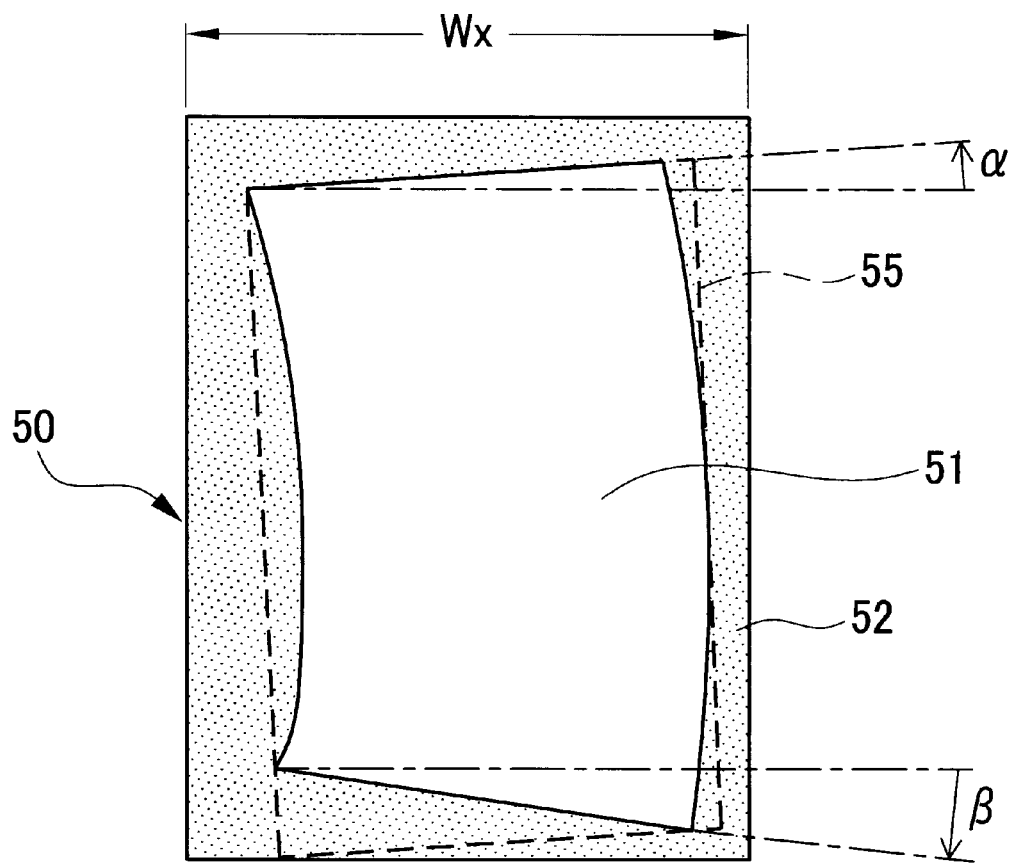
FIG. 9 shows another example of an output range of an image represented by the image data.

For example, as shown in FIG. 9, when the difference between the inclinations α and β is relatively large, the scanner 100 assumes that a relatively large rotation skew has occurred. If trimming is executed so that the output range 55 is defined as a rectangular area within an area surrounded by the edges in the image data 50, portions of the original document area 51 excluded in the output range 55 increase, and it becomes likely that information will be missing. Therefore, according to the illustrative embodiment, when the difference between the inclinations α and β is relatively large, the size of the output range 55 is enhanced in comparison with a case where the size of the original is the same but the difference of the inclinations α and β is not so large. That is, the size of the output range 55 is made larger as the curving amount of the side-end is larger. Therefore, missing of information can be suppressed. Further, the size of the output range 55 is made larger when the difference between the inclinations α and β is greater, missing of information can be suppressed.

The scanner 100 determines, for example, a rectangular area surrounded by the edges in the image data 50 as the output range 55. That is, the scanner 100 compares the inclination α with the inclination β, and determines the end constituting one side of the output range 55 and the rotation amount for the inclination compensation. Further, the scanner 100 determines the output range 55 such that side other than the side constituting the one side of the output range 55 contact the edges from outside. With this configuration, it is expected that missing of information is suppressed. It is noted that, when the curving amount of the side-end is relatively large, the scanner 100 executes the similar process.

It is noted that a process executed in S210 when the inclination is relatively large and the original document is long, and a process executed S210 when the inclination is relatively small and the original document is short (S212: NO) may be slightly differentiated. For example, when the original document is long, as shown in FIG. 8, the output range 55 may be determined such that a part of the trailing end Eb is outside the output range 55 in S210. In contrast, when the original document is short, as shown in FIG. 9, the output range 55 may be determined such that the trailing end Eb is completely included in the output range 55 in S210. Alternatively, in both cases, the output range 55 may be determined to completely include the trailing end Eb in S210.

After execution of S208 or S210, the scanner determines whether the curved amount of the side-end is greater than a process threshold value (S215). The process threshold value is a value smaller than the curvature threshold value used in S210. When it is determined that the curvature of the side-end is greater than the process threshold value (S215: YES), an area outside the edges of the output image after rotation, that is, the area corresponding to the gray area 52 representing an image of the gray plate 23 is processed such that the area outside the edges of the output image to have a color same as a background color of the original document (S216), and the scanner 100 terminates the rotational skew handling process. It is noted that the gray area 52 is an example of an extra-edge area.

The background color of the original document can be defined as a color which occupies the largest area within the original document area 51 or a color which occupies a particular area at the leading end portion of the original document area 51. By processing the gray area 52 so that the area outside the edges of the output image to have the same color as the background color of the original document, it is possible to suppress the appearance of the output image from being deteriorated. It is noted that processing the gray area 52 to have the background color requires a relatively long time. Therefore, it may be effective to prioritize the appearance by executing a coloring process to process the gray area 52 to have the background color when the curved amount is relatively large and it is likely that an area outside the area surrounded by the edges is large, while the coloring process is skipped when it is likely that the area outside the area surrounded by the edges is relatively small so that delay of output is suppressed.

When the background color of the original document and the color of the gray area 52 are substantially the same, the scanner may skip S215 and S216. It is noted that S216 may be executed prior to rotation. The process of S216 is an example of the coloring process.

When it is determined that the curved amount of the side-end is not greater than the processing threshold value (S215: NO), the scanner 100 skips S216, and terminates the rotational skew handling process. When the curved amount is relatively small, it is not likely that the output range 55 includes the gray area 52. Therefore, in such a case, necessity of the coloring process is small. When the rotational skew handing process is terminated, the scanner 100 returns to FIG. 6 and generates the output data (S109), and then terminates the output data generating process.

When it is determined that at least one of (a) the difference between the inclinations α and β is greater than the inclination difference threshold value, and (b) the curved amount of a side-end is greater than the curvature threshold value is satisfied, and when it is determined that the original document is a long document (S212: YES), a dividing/combining process is executed (S218). The dividing/combining process is a process configure to divide the original document area 51 into a plurality of sub areas, apply trimming and/or rotation to each of the sub areas, and combine the sub areas.

Figure 10:
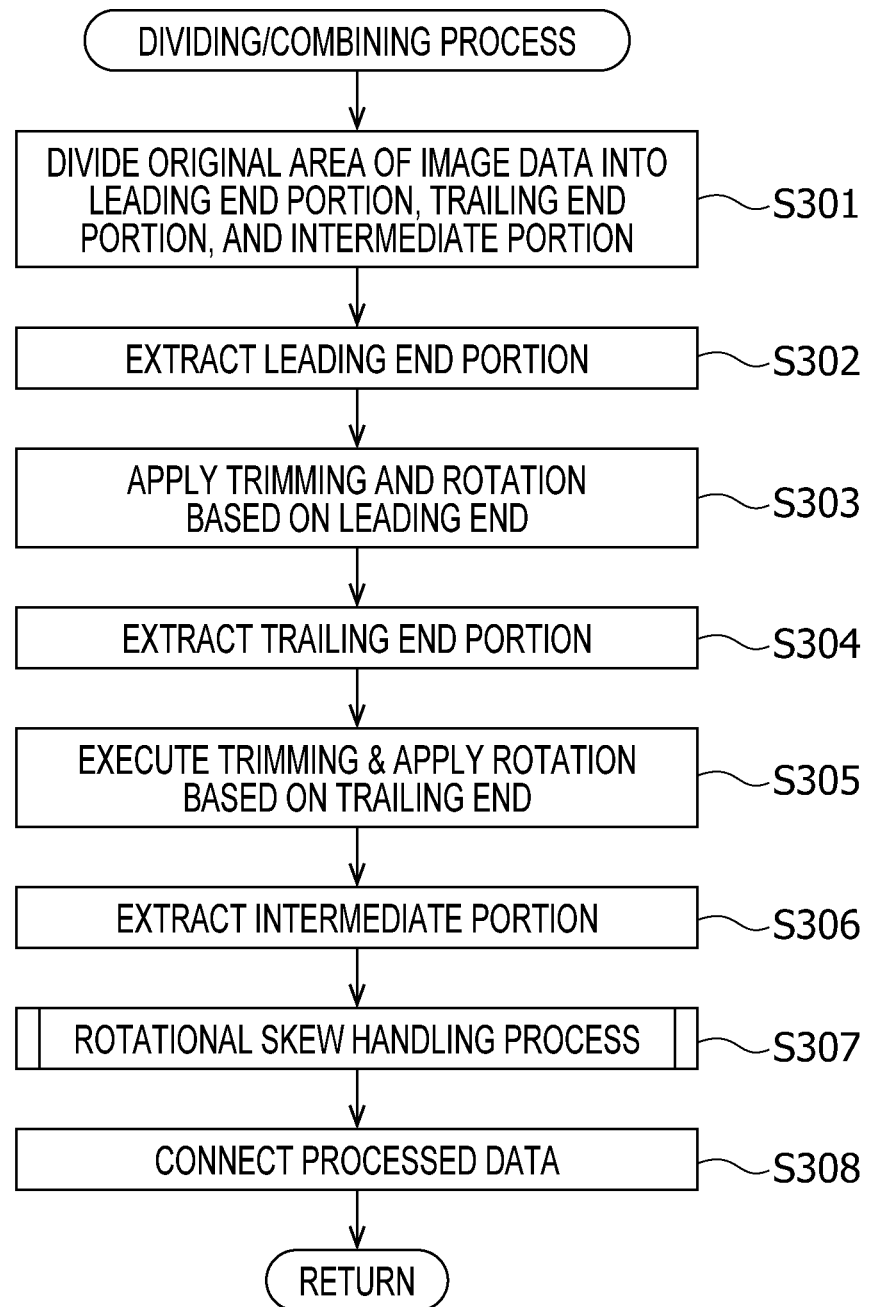
FIG. 10 is a flowchart illustrating a dividing/combining process according to aspects of the disclosures.
Figure 11:
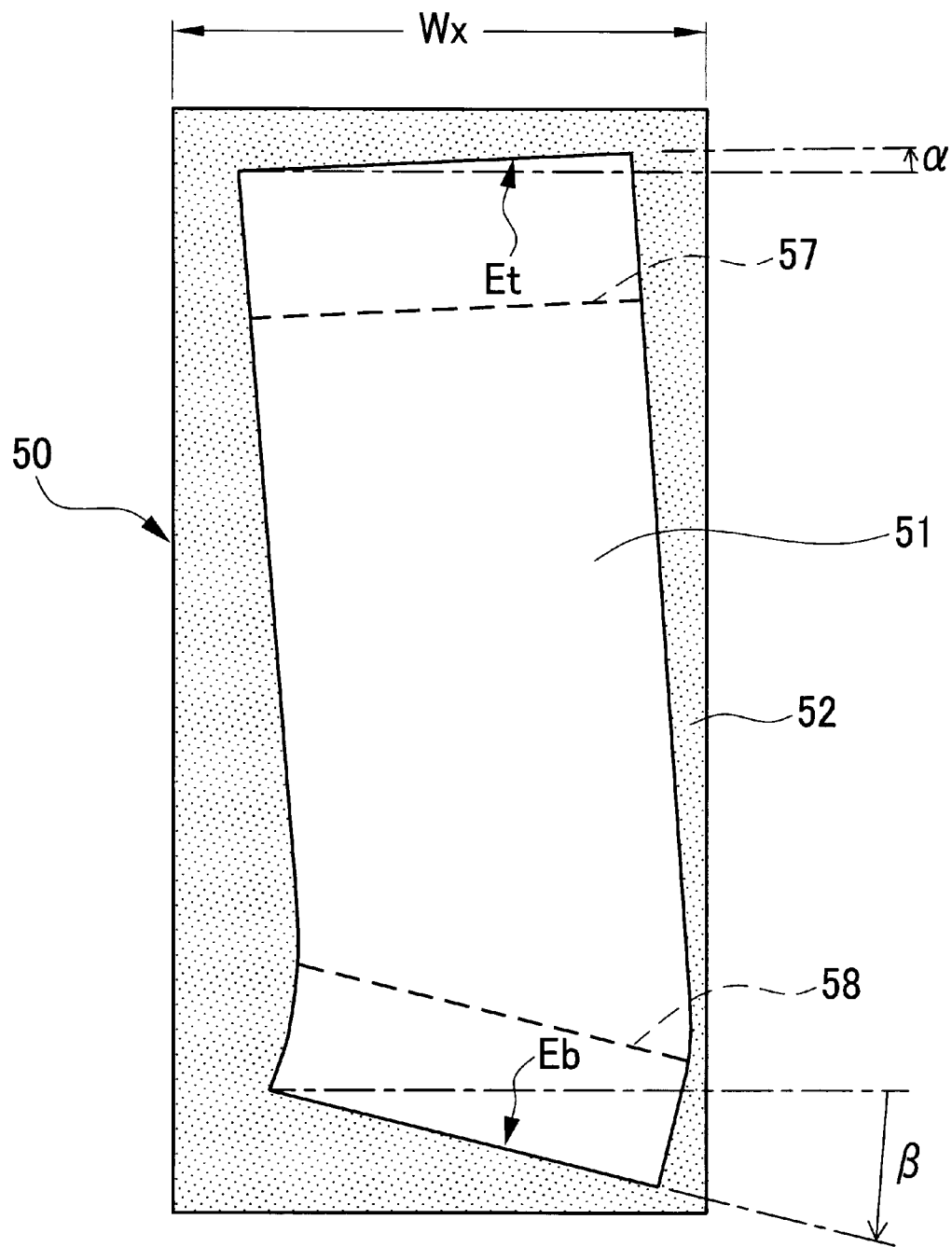
FIG. 11 shows an example of division of an image represented by the image data according to aspects of the disclosures.

FIG. 10 is a flowchart illustrating the dividing/combining process which is called in S218 of FIG. 7. The dividing/combining process is a process to generate the output data based on the image data 50 of the long original document which has been scanned with relatively large rotational skew as shown in FIG. 11.

In the dividing/combining process, the scanner 100 divides the original document area 51 of the image data 50 into a leading end portion including the leading end Et, a trailing end portion including the trailing end Eb, and an intermediate portion between the leading end portion and the trailing end portion (S301). For example, as shown in FIG. 11, a leading end portion of the original document area 51 divided by a division line 57 which is parallel with the leading end Et and spaced from the leading end Et by a first particular dividing distance is defined as the leading end portion. Similarly, a trailing end portion of the original document area 51 divided by a division line 58 which is parallel with the trailing end Eb and spaced from the trailing end Eb by a second particular dividing distance is defined as the trailing end portion. A portion of the original document area 51 between the dividing lines 57 and 58 is defined as the intermediate portion. It is noted that the first particular dividing distance and the second particular dividing distance may be the same or different. It is noted that each of the leading end portion, trailing end portion and intermediate portion is an example of a divided area.

The dividing distance (i.e., the first/second dividing distance) corresponds, for example, to a distance between the first conveying roller pair 42 and the second conveying roller pair 43 (see FIG. 1). When the leading end of the original document has reached the first conveying roller pair 42 and until the leading end of the original document reaches the second conveying roller pair 43, the original document is conveyed only by the first conveying roller pair 43. When the leading end of the original document has reached the second conveying roller pair 43 and until the trailing end of the original document reaches the first conveying roller pair 42, the original document is conveyed by both the first conveying roller pair 42 and the second conveying roller pair 43. As above, conveying conditions are different at the end portions and the intermediate portion, and there is a possibility that the conveying direction of the original document may change.

Then, the scanner 100 generates the output data of each of the leading end portion, the trailing end portion and the intermediate portion. For example, the scanner 100 extracts the leading end portion from the image data 50 (S302). Then, with respect to the extracted leading end portion, the scanner 100 applies trimming and rotation with use of the leading end Et (S303), thereby generating the output data corresponding to the leading end portion.

Further, the scanner 100 extracts the trailing end portion from the image data 50 (S304). Then, with respect to the extracted trailing end portion, the scanner applies trimming and rotation with use of the trailing end Eb (S305), thereby generating the output data of the trailing end portion.

Further, the scanner 100 extracts the intermediate portion from the image data 50 (S306). Then, with respect to the extracted intermediate portion, the scanner 100 executes the rotational skew handling process (see FIG. 7) with regarding the dividing line 57 as the leading end, and the dividing line 58 as the trailing end (S307).

When the scanner 100 determines that, with respect to the intermediate portion, for example, the difference between the inclination of the leading end and the inclination of the trailing end is relatively large and the intermediate portion is not long, the scanner 100 executes S210 of in FIG. 7. That is, the scanner 100 applies trimming within an area including both the side-ends, and applies rotation for inclination compensation based on the smaller one of the inclinations of the leading end (i.e., the dividing line 57) and the trailing end (i.e., the dividing line 58) to generate the output data of the intermediate portion.

It is noted that processing of the leading end portion (i.e., S302 and S303), processing of the trailing end portion (i.e., S304 and S305) and processing of the intermediate portion (i.e., S306 and S307) can be executed in any order or in parallel. Further, division of the original document area may be executed such that the original document area is divided substantially evenly in the conveying direction. It is noted that the rotating amount of the intermediate portion may be determined based on one of the leading end and the trailing end (e.g., one having a smaller inclination).

Thereafter, the scanner combines the output data generated from each of the divided portion (S308) and terminates the dividing/combining process. In FIG. 7, after execution of the dividing/combining process in S218, the scanner 100 terminates the rotation skew handling process. In FIG. 6, after execution of the rotational skew handling process in S115, the scanner 100 generates the output data (S109) and terminates the output data generating process.

In the dividing/combining process, the scanner 100 refers to both the inclinations α and β in determining the output range 55 and determining the rotation amount for inclination compensation. That is, for the leading end portion including the leading side end Et, trimming and rotation are executed based on the inclination α of the leading end Et, and for the trailing end portion including the trailing end Eb, trimming and rotation are executed based on the inclination β of the trailing end Eb. Since a plurality of pieces of output data respectively generated from the divided portions are combined to generate entire output data, it is expected that missing of information is well suppressed in comparison with a case where trimming and rotation are applied to an entire image based on the inclination of one end.

When the intermediate portion is still long and the curved amount is relatively large, the scanner 100 further executes the dividing/combining process in the rotational skew handling process. That is, the scanner 100 further divides the intermediate portion into a leading end portion, a trailing end portion and an intermediate portion, and applies trimming and rotation to each of the divided portions. When the intermediate portion after division is not long any more, the scanner 100 can generate the output data of the intermediate portion by the rotational skew handling process. Accordingly, the scanner 100 combines all the pieces of output data to generate one piece of output data.

As described in detail, the scanner 100 according to the illustrative embodiment of the disclosures is configured to extract edges of the original document from the image data 50 obtained by scanning, and obtains the inclination α of the leading end Et and the inclination β of the trailing end Eb. Then, when it is determined that the difference between the inclinations α and β is greater than the particular rotational skew threshold, the scanner 100 determines that the rotational skew has occurred such that the inclination of the original document has changed as the original document was conveyed. Since the scanner 100 is configured to determine whether the rotational skew has occurred, it is possible to select appropriate process corresponding to the conveyance condition of the original document. As a result, in the scanner 100 which scans an image with conveying the original document, appropriate process can be executed in accordance with the conveying condition of the original document.

It is noted that the above-described embodiment is only one of illustrative embodiments and is not intended to limit aspects of the disclosures. Accordingly, various improvements and modifications can be made without departing from scopes or aspects of the disclosures. For example, the above-described technique can be applied not only to a scanning apparatus but any apparatus such as a copier, an MFP (multi-function peripheral) which has a function of scanning an image of an original document with conveying the same.

It is noted that a white plate may be used instead of the gray plate 23. In such a case, when the original document has a white background, the coloring process can be omitted. It is note that, with use of the gray plate 23, edges of the original sheet can be extracted appropriately when the background color of the original document is white.

Further, the output data generating process may be modified such that the rotational skew is determined to be occurred when a decision in S105 is YES. That is, determination steps S112 and S113 may be omitted. However, when the size of the original document is small, or when the side-ends are linear, the possibility that the rotational skew is occurring is small. Therefore, by having steps S112 and S113, more appropriate determination can be expected.

For example, the scanner 100 may be configured to acquire user setting for each of the threshold values. That is, each of the threshold value may be a fixed value stored in the ROM 32 or a variable value stored in the NVRAM 34.

For example, the determination in S106 of the output data generating process may be omitted. That is, when it is determined that the rotation skew has not occurred, trimming and rotation may be executed regardless of the inclination angle.

According to the illustrative embodiment, when the curved amount is greater than the process threshold value, the area outside the edges are processed to have the background color in S216. This configuration may be modified such that the area outside the edges are processed to have the background color regardless of the amplitude of the curved amount. That is, all the gray area 25 included in the output data may be processed to have the background color. Alternatively, the area outside the edges may not be processed to have the background color regardless of the amplitude of the curved amount. When the area outside the edges is processed to have the background color, appearance of the output data is improved, while when the area outside the edges is not processed to have the background color, it is expected that a process period is shortened.

In the illustrative embodiment, the original document area 51 is divided into three portions in S301. It is noted that that the original document area 51 may be divide into a plurality of portions and the number of the divided portions need not be limited to three. When the original document area 51 is divided into two portions, the scanner 100 may generate output data for the leading end portion based on the leading end Et, and output data for the trailing end portion based on the trailing end Eb. It is noted that the original document are 51 may be divided into four or more portions. Further, according to the illustrative embodiment, the rotational skew handling process is applied to the intermediate portion in S307. This can be modified such that the same process may be applied to all the divided portions based on one of the dividing line, instead of the process of S307.

According to the illustrative embodiment, when it is determined that the rotational skew has occurred, the rotational skew handling process is executed in S115 to generate compensated output data. This configuration may be modified such that, instead of S115, an error notification is made to encourage the user to re-set the original documents and re-execute the scanning.

According to the illustrative embodiment, the scanner 100 determines occurrence of the rotational skew. This configuration may be modified such that a personal computer (PC) or the like which is connected with the scanner 100 may be configured to determine whether the rotational skew has occurred. In such a case, for example, the PC instructs the scanner to scan an image of the original document and transmission of image data, thereby obtain the image data from the scanner. Then, in response to acquisition of the image data, the PC may extract edges, obtain inclinations of ends, and determine whether the rotational skew has occurred.

Figure 6:
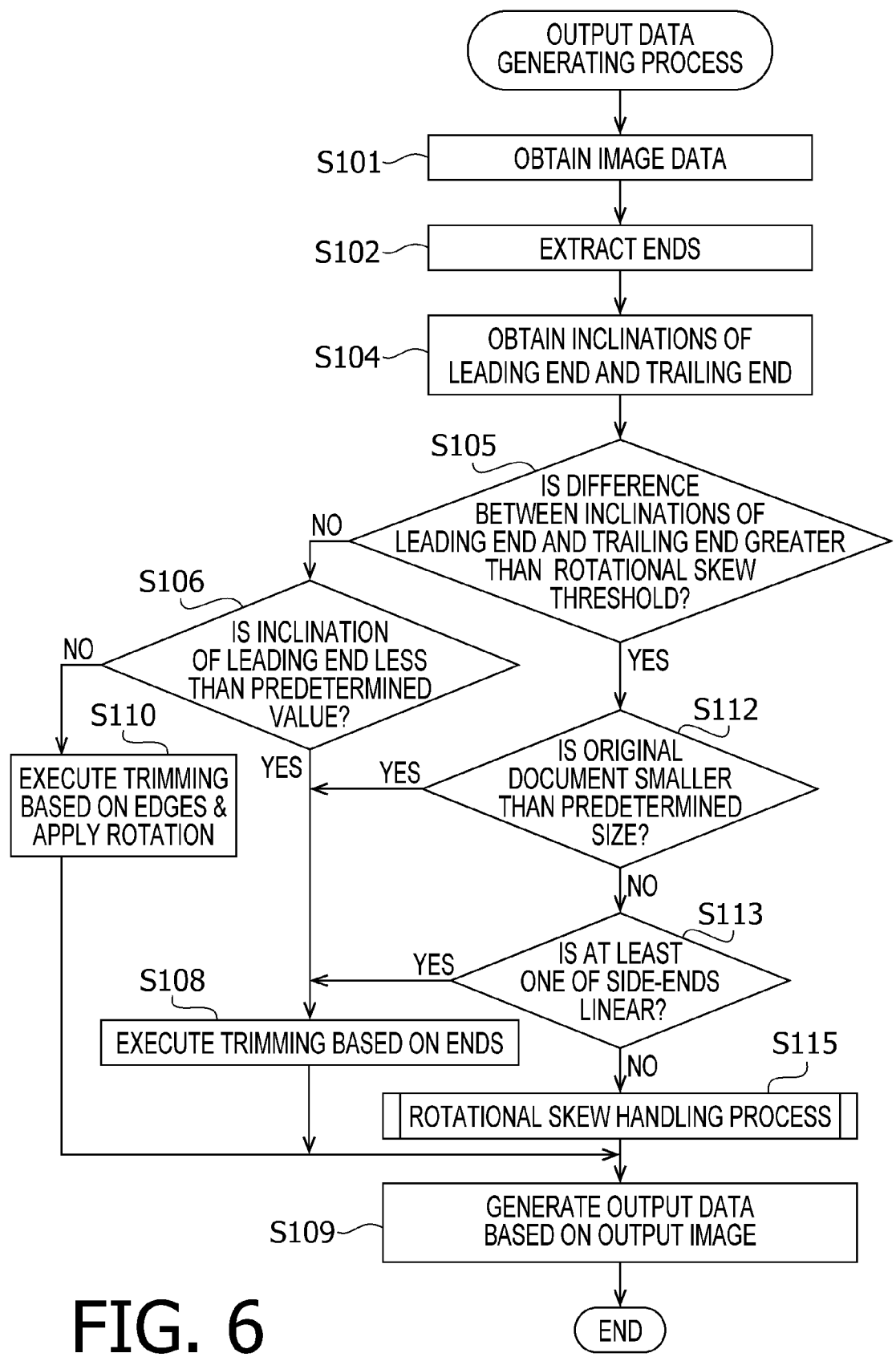
FIG. 6 is a flowchart illustrating an output data generating process according to aspects of the disclosures.

Specifically, the PC may execute a process similar to the output data generating process shown in FIG. 6 with changing a step of obtaining image data (S101) to a step of receiving image data by communicating with the scanner. It is noted that, when the designated output device is the PC itself, the PC may not output the generated output data and simply store the same to a storage (e.g., a hard disk drive) of the PC.

It is note that the processes disclosed in the description of the illustrative embodiment may be executed by a single CPU, a plurality of CPU's, hardware such as an ASIC or any combinations thereof. Further, the processed as disclosed can be realized in various ways and aspects, which may include a non-transitory computer-readable medium storing programs executed the processes, methods of executed the processes or the like.

What is claimed is:

1. A scanning apparatus, comprising:
a conveyer configured to convey an original document;
a scanning device configured to scan an image on the original document conveyed by the conveyer; and
a controller,
the controller being configured to execute:
an extraction process which causes the scanning apparatus to extract edges of the original document from the image scanned by the scanning device;
an end obtaining process which causes the scanning apparatus to obtain a leading end of the original document and a trailing end of the original document based on the extracted edges in the extraction process;
an inclination obtaining process which causes the scanning apparatus to obtain a first inclination of the leading end of the original document and a second inclination of the trailing end, the first inclination indicating an inclination angle and an inclination direction of the leading end with respect to a direction orthogonal to a conveying direction of the original document, the second inclination indicating an inclination angle and a direction of the trailing end with respect to the direction orthogonal to the conveying direction of the original document;
a calculating process which causes the scanning apparatus to obtain an angle difference between an inclination angle of the first inclination and an inclination angle of the second inclination; and
a determination process which causes the scanning apparatus to determine that a rotational skew has occurred when the angle difference is greater than a rotational skew threshold value, the rotational skew being a change of inclination of the original document during conveyance of the original document, wherein the controller is configured to further execute a rotation compensation process which causes the scanning apparatus to extract an output image from the scanned image of the scanning device and applies rotation to the output image, when it is determined in the determination process that the rotational skew has occurred.

2. The scanning apparatus according to claim 1, wherein the rotation compensation process further causes the scanning apparatus to determine, based on the first inclination and the second inclination, at least one of an area of the output image to be extracted and a rotation amount, when it is determined in the determination process that the rotational skew has occurred.

3. The scanning apparatus according to claim 2,
wherein the rotation compensation process further causes the scanning apparatus to determine an output area which is a rectangular area extracted as the output image from the scanned image based on the first inclination and the second inclination when it is determined in the determination process that the rotational skew has occurred.

4. The scanning apparatus according to claim 3,
wherein the rotation compensation process further causes the scanning apparatus to determine an area included within an area surrounded by the edges extracted in the extraction process as the output area.

5. The scanning apparatus according to claim 3,
wherein the rotation compensation process further causes the scanning apparatus to:
determine whether a curved amount of a side-end in the conveying direction is greater than a curvature threshold value based on the edges extracted in the extraction process; and
increase a size of the output area when it is determined that the curved amount is greater than the curvature threshold value in comparison with the size of the output area when the curved amount is not greater than the curvature threshold value.

6. The scanning apparatus according to claim 3,
wherein the rotation compensation process further causes the scanning apparatus to:
determine whether a length of the original document in the conveying direction is longer than a length threshold value; and
increase a size of the output area in a direction orthogonal to the conveying direction when it is determined that the length of the original document is greater than the length threshold value in comparison with the size of the output area in the direction orthogonal to the conveying direction when the length of the original document is not greater than the length threshold value.

7. The scanning apparatus according to claim 3,
wherein the rotation compensation process further causes the scanning apparatus to:
determine whether a difference between the first inclination and the second inclination is greater than an inclination difference threshold value; and
increase a size of the output area when it is determined that the difference between the first inclination and the second inclination is greater than the inclination difference threshold value in comparison with the size of the output area when the difference between the first inclination and the second inclination is not greater than the inclination difference threshold value.

8. The scanning apparatus according to claim 3,
wherein the controller is further configured to execute a coloring process which causes the scanning apparatus to convert a color of an extra-edge area to a similar color to a background color of the original document, the extra-edge area being an area within the output area and outside the area surrounded by the edges extracted in the extraction process.

9. The scanning apparatus according to claim 8,
wherein the controller is further configured to determine whether a curved amount of a side-end of the original document in the conveying direction is greater than a process threshold value based on the edges extracted in the extraction process,
wherein the controller executes the coloring process when it is determined that the curved amount is greater than the process threshold value, while the controller does not execute the coloring process when it is determined that the curved amount is not greater than the process threshold value.

10. The scanning apparatus according to claim 2,
wherein, when the determination process determines that the rotational skew has occurred, the rotation compensation process further causes the scanning apparatus to compare the first inclination with the second inclination and execute at least one of determination of the output area and determination of the rotation amount based on one of the first inclination and the second inclination having a smaller inclination angle.

11. The scanning apparatus according to claim 10,
wherein the rotation compensation process is further configured to cause the scanning apparatus to:
determine an innermost position of an inwardly curved side-end of the original document based on the edges extracted in the extraction process;
obtain a first distance from the leading end to the innermost position and a second distance from the trailing end to the innermost position; and
determine at least one of the output area and the rotation amount based on the inclination of a longer one of the first distance and the second distance as obtained.

12. The scanning apparatus according to claim 2,
wherein the rotation compensation process is further configured to cause the scanning apparatus to:
divide the output image into at least two divided images such that the at least two divided images are aligned in the conveying direction; and
determine a rotation amount of each of the at least two divided images, a rotation amount of a divided image including the leading end being determined based on the first inclination, a rotation amount of a divided image including the trailing end being determined based on the second inclination,
wherein the controller is further configured to execute a combining process which causes the scanning apparatus to combine all the divided images after the rotation process is applied to form a single image.

13. The scanning apparatus according to claim 12,
wherein the controller is further configured to determine whether a length of the original document in the conveying direction is longer than a division threshold value, and
wherein the rotation compensation process is further configured to cause the scanning apparatus to execute the combining process when it is determined that the length of the original document is longer than the division threshold value, while the rotation compensation process is configured not to cause the scanning apparatus to execute the combining process when it is determined that the length of the original document is not longer than the division threshold value.

14. The scanning apparatus according to claim 1,
wherein the determination process is further configured to cause the scanning apparatus not to determine that the rotational skew has occurred when it is determined that at least one of the side-ends of the original document is linear based on the edges extracted in the extraction process even if the difference between the first inclination and the second inclination is greater than the rotational skew threshold value.

15. The scanning apparatus according to claim 1,
wherein the determination process is further configured to cause the scanning apparatus not to determine that the rotational skew has occurred when it is determined that the size of the original document is less than a particular size even if the difference between the first inclination and the second inclination is greater than the rotational skew threshold value.

16. A non-transitory computer-readable medium containing instructions to be executed by a controller of a scanning apparatus,
wherein the controller executes:
an extraction process which causes the scanning apparatus to extract edges of an original document from an image scanned by a scanning device;
an end obtaining process which causes the scanning apparatus to obtain a leading end of the original document and a trailing end of the original document based on the edges extracted in the extraction process;
an inclination obtaining process which causes the scanning apparatus to obtain a first inclination of a leading end and a second inclination of a trailing end, the first inclination indicating an inclination angle and an inclination direction of the leading end with respect to a direction orthogonal to a conveying direction of the original document, the second inclination indicating an inclination angle and an inclination direction of the trailing end with respect to the direction orthogonal to the conveying direction of the original document;
a calculating process which causes the scanning apparatus to obtain an angle difference between an inclination angle of the first inclination and an inclination angle of the second inclination; and
a determination process which causes the scanning apparatus to determine that a rotational skew has occurred when the angle difference is greater than a rotational skew threshold value, the rotational skew being a change of inclination of the original document during conveyance of the original document, wherein the controller is configured to further execute a rotation compensation process which causes the scanning apparatus to extract an output image from the scanned image of the scanning device and applies rotation to the output image, when it is determined in the determination process that the rotational skew has occurred.

17. A method for a scanning apparatus comprising:
an extraction process which causes the scanning apparatus to extract edges of an original document from an image scanned by a scanning device;
an end obtaining process which causes the scanning apparatus to obtain a leading end of the original document and a trailing end of the original document based on the edges extracted in the extraction process;
an inclination obtaining process which causes the scanning apparatus to obtain a first inclination of a leading end and a second inclination of a trailing end, the first inclination indicating an inclination angle and an inclination direction of the leading end with respect to a direction orthogonal to a conveying direction of the original document, the second inclination indicating an inclination angle and an inclination direction of the trailing end with respect to the direction orthogonal to the conveying direction of the original document;
a calculating process which causes the scanning apparatus to obtain an angle difference between an inclination angle of the first inclination and an inclination angle of the second inclination; and
a determination process which causes the scanning apparatus to determine that a rotational skew has occurred when the angle difference is greater than a rotational skew threshold value, the rotational skew being a change of inclination of the original document during conveyance of the original document, and
executing a rotation compensation process which causes the scanning apparatus to extract an output image from the scanned image of the scanning device and applies rotation to the output image, when it is determined in the determination process that the rotational skew has occurred.

* * * * *